United States Patent
McIntosh et al.

(10) Patent No.: US 7,861,305 B2
(45) Date of Patent: Dec. 28, 2010

(54) METHOD AND SYSTEM FOR HARDWARE BASED PROGRAM FLOW MONITOR FOR EMBEDDED SOFTWARE

(75) Inventors: Suzanne McIntosh, Clifton, NJ (US); Daniel Brand, Millwood, NY (US); Matthew Kaplan, New York, NY (US); Paul A. Karger, Chappaqua, NY (US); Michael G. McIntosh, Clifton, NJ (US); Elaine R. Palmer, Golden Bridges, NY (US); Amitkumar M. Paradkar, Mohegan Lake, NY (US); David Toll, Wappingers Falls, NY (US); Samuel M. Weber, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 995 days.

(21) Appl. No.: 11/672,288

(22) Filed: Feb. 7, 2007

(65) Prior Publication Data

US 2008/0189530 A1 Aug. 7, 2008

(51) Int. Cl.
*G06F 12/14* (2006.01)
(52) U.S. Cl. ................ 726/24; 713/187; 713/188
(58) Field of Classification Search ............... None
See application file for complete search history.

(56) References Cited

U.S. PATENT DOCUMENTS

| | | | | |
|---|---|---|---|---|
| 4,108,359 | A * | 8/1978 | Proto | 714/732 |
| 5,222,220 | A * | 6/1993 | Mehta | 714/38 |
| 5,974,529 | A * | 10/1999 | Zumkehr et al. | 712/41 |
| 6,044,458 | A * | 3/2000 | Rinkenberger et al. | 712/227 |
| 6,421,790 | B1 * | 7/2002 | Fruehling et al. | 714/30 |
| 6,543,012 | B1 * | 4/2003 | Viswanathan et al. | 714/50 |
| 6,615,324 | B1 * | 9/2003 | Fernald | 711/153 |
| 6,772,345 | B1 | 8/2004 | Shetty | |
| 7,096,500 | B2 | 8/2006 | Roberts et al. | |
| 7,607,122 | B2 * | 10/2009 | Hatlelid et al. | 717/127 |
| 7,620,941 | B1 * | 11/2009 | Leventhal | 717/128 |
| 7,644,322 | B2 * | 1/2010 | Dye | 714/50 |
| 2002/0147915 | A1 | 10/2002 | Chefalas et al. | |
| 2003/0120952 | A1 | 6/2003 | Tarbotton et al. | |
| 2003/0172293 | A1 * | 9/2003 | Johnson et al. | 713/200 |
| 2004/0088570 | A1 | 5/2004 | Roberts et al. | |

(Continued)

OTHER PUBLICATIONS

Nick L. Petroni, Jr. et al., Copilot- a Coprocessor—based Kernel Runtime Integrity Monitor, 13th USENIX Security Symposium, 2004, University of Maryland, College Park, MD.

(Continued)

*Primary Examiner*—William R Korzuch
*Assistant Examiner*—Michael R Vaughan
(74) *Attorney, Agent, or Firm*—Cantor Colburn LLP; Preston Young

(57) ABSTRACT

A method for malware detection, wherein the method includes: utilizing a hardware based program flow monitor (PFM) for embedded software that employs a static analysis of program code; marrying the program code to addresses, while considering which central processing unit (CPU) is executing the program code; capturing an expected control flow of the program code, and storing the control flow as physical address pairs of leaders and followers (LEAD-FOLL pair) in a Metadata Store (MDS) within the PFM; monitoring control flow at runtime by the PFM; and comparing runtime control flow with the expected control flow.

13 Claims, 3 Drawing Sheets

U.S. PATENT DOCUMENTS

| | | | |
|---|---|---|---|
| 2005/0033982 A1* | 2/2005 | Paaske | 713/200 |
| 2005/0223238 A1* | 10/2005 | Schmid et al. | 713/188 |
| 2005/0240897 A1* | 10/2005 | Kailas | 717/100 |
| 2007/0006159 A1* | 1/2007 | Hecht et al. | 717/124 |
| 2007/0055711 A1* | 3/2007 | Polyakov et al. | 707/203 |
| 2007/0101431 A1* | 5/2007 | Clift et al. | 726/24 |
| 2008/0115217 A1* | 5/2008 | Barron et al. | 726/24 |

OTHER PUBLICATIONS

Suresh N. Chari et al., BlueBoX: A Policy-Driven, Host-Based Intrusion Detection System, NDSS 2002, United States.

Andreas Wespi et al., Intrusion Detection Using Variable-Length Audit Trail Patterns, Springer-Verlag Berlin Heidelberg 2000, vol. 1907, Switzerland.

* cited by examiner

```
        sub X
a1      cmp   r0, 0
...
b1      brgz  r1, a1
b2      brez  r0, b1
b3      brgz  r1, a1
b4      brgz  r0, b1
b5      br    c1
b6      br    b1
...
c1      add   m, 1
c2      br    b6
        end X
```

```
        sub D
d1      nop
d2      nop
d3      nop
d4      nop
d5      reti
        end D
```

| | |
|---|---|
| a1 | b1 |
| a1 | d1 |
| b1 | a1 |
| b1 | b2 |
| b1 | d1 |
| b2 | b1 |
| b2 | b3 |
| b2 | d1 |
| b3 | a1 |
| b3 | b4 |
| b3 | d1 |
| b4 | b1 |
| b4 | b5 |
| b4 | d1 |
| b5 | c1 |
| b5 | d1 |
| b6 | b1 |
| b6 | d1 |
| c1 | c2 |
| c1 | d1 |
| c2 | b6 |
| c2 | d1 |
| d1 | d2 |
| d2 | d3 |
| d3 | d4 |
| d4 | d5 |
| d5 | a1 |
| d5 | b1 |
| d5 | b2 |
| d5 | b3 |
| d5 | b4 |
| d5 | b5 |
| d5 | b6 |
| d5 | c1 |
| d5 | c2 |

FIG. 7

METHOD AND SYSTEM FOR HARDWARE BASED PROGRAM FLOW MONITOR FOR EMBEDDED SOFTWARE

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates generally to malware detection, and more particularly to systems and methods for providing a hardware-based program flow monitor for embedded software that employs a static analysis of the program code, marries the binary code to addresses while considering which processor will be executing the code, captures the expected control flow of the program and stores them as physical address pairs. Thereafter, a hardware component monitors the control flow at runtime and compares the runtime control flow to the expected control flow to detect malicious code.

2. Description of the Related Art

Current software systems are vulnerable to attack from people and systems known as "hackers" who seek to compromise a system by introducing carefully crafted instructions into an otherwise healthy software system. These instructions, referred to as 'malware', are often introduced as 'patches' that overlay a block of instructions belonging to the healthy program. Alternately, the malware can be placed in an unused area of memory. To execute malware, the hacker often redirects the target of a branch or jump instruction to the memory address where the malware resides.

Presently available malware detection solutions are software-based and often run only at system startup (and never again until the next power cycle). Other similar solutions run in very limited instances during system operation—such as when specific system calls are invoked. The sparse monitoring just described leaves the system vulnerable whenever there is a gap in the monitoring. In both cases, this leaves the door wide open for malware to be inserted, executed, and even removed before detection. In addition, a software based solution is vulnerable because a hacker can:

1. Disable the malware detector from running at all.
2. Modify the malware detector such that it either accomplishes nothing useful or is prevented from reporting the errors it found.

Software-based malware detection solutions search for known malware patterns. The set of known patterns grows with each new virus released and the software-based tools, therefore, must be kept up to date and their suite of known patterns kept current. Maintaining a database of known patterns is a labor-intensive, manual task. In addition, a software solution to malware detection relies heavily on the health of the host software environment—for example the operating system, utilities, library functions, etc. must be trustworthy and healthy. Unfortunately, the host software environment is itself vulnerable to attacks and the presence of malware in the supporting environment serves to undermine the efforts of the malware detection software. The health of the host environment is not easily proven, and yet the trustworthiness of the supporting environment is prerequisite if a software-based solution to malware detection is to be trusted. Moreover, the question remains—How can the user be certain that the malware detection software is not also infected?

SUMMARY OF THE INVENTION

A method for malware detection, wherein the method includes: utilizing a hardware based program flow monitor (PFM) for embedded software that employs a static analysis of program code; marrying the program code to addresses, while considering which central processing unit (CPU) is executing the program code; capturing an expected control flow of the program code, and storing the control flow as physical address pairs of leaders and followers (LEAD-FOLL pair) in a Metadata Store (MDS) within the PFM; monitoring control flow at runtime by the PFM; and comparing runtime control flow with the expected control flow.

An article comprising machine-readable storage media containing instructions that when executed by a processor enable the processor to provide malware detection, wherein the instructions include: utilizing a hardware based program flow monitor (PFM) for embedded software that employs a static analysis of program code; marrying the program code to addresses, while considering which central processing unit (CPU) is executing the program code; capturing an expected control flow of the program code, and storing the control flow as physical address pairs of leaders and followers (LEAD-FOLL pair) in a Metadata Store (MDS) within the PFM; monitoring control flow at runtime by the PFM; and comparing runtime control flow with the expected control flow.

A system for malware detection, where the system includes: a hardware based program flow monitor (PFM) for embedded software that employs a static analysis of program code; and wherein the PFM further includes: a logic unit (LU); a metadata store (MDS); and a register file (RF).

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, a solution is technically achieved for a system and method for providing a hardware based program flow monitor for embedded software that employs a static analysis of the program code, and marries the binary code to addresses while considering which processor will be executing the code, to capture the expected control flow of the program and to store them as physical address pairs. Thereafter, a hardware component monitors the control flow at runtime and compares the runtime control flow to the expected control flow to detect malicious code.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 6 is a list of the set of all possible Follower addresses for each Leader address based on the example program of F according to an embodiment of the invention.

FIG. 7 is an alternate representation of control flow for program address ranges according to an embodiment of the invention.

The detailed description explains the preferred embodiments of the invention, together with advantages and features, by way of example with reference to the drawings.

DETAILED DESCRIPTION OF SPECIFIC EMBODIMENTS

Embodiments of the present invention provide a system and method for providing a hardware based program flow monitor for embedded software that employs a static analysis of the program code, and marries the binary code to addresses while considering which processor will be executing the code, to capture the expected control flow of the program and to store them as physical address pairs. Thereafter, a hardware component monitors the control flow at runtime and compares the runtime control flow to the expected control flow to detect malicious code.

The Program Flow Monitor (PFM) hardware-based malware protection solution described herein does not have any of the vulnerabilities associated with software-based solutions and, in addition, is able to continuously monitor for malware. The PFM can perform its monitoring functions without degrading system performance and may be considered for use in a hard real-time environment. Through its continuous monitoring capability, the PFM cannot only detect malware, but it can also detect certain component failures that may occur in physical program memory.

Embodiments of the Program Flow Monitor (PFM) continuously monitor an executing program and detect when the program has strayed from the normal, expected flow of execution. Such a disruption in the normal flow is attributable to either the presence of malware or a hardware error (either naturally occurring or induced). In some cases, it is possible for the PFM to detect an invalid control flow before the illegal instruction is ever executed. The PFM can also detect improper control flow caused by patches to the jump table or interrupt descriptor table (IDT), as well as attempts to execute malware patched into an area of memory beyond the normal executing range of the program.

Figures 1, 2, 3:
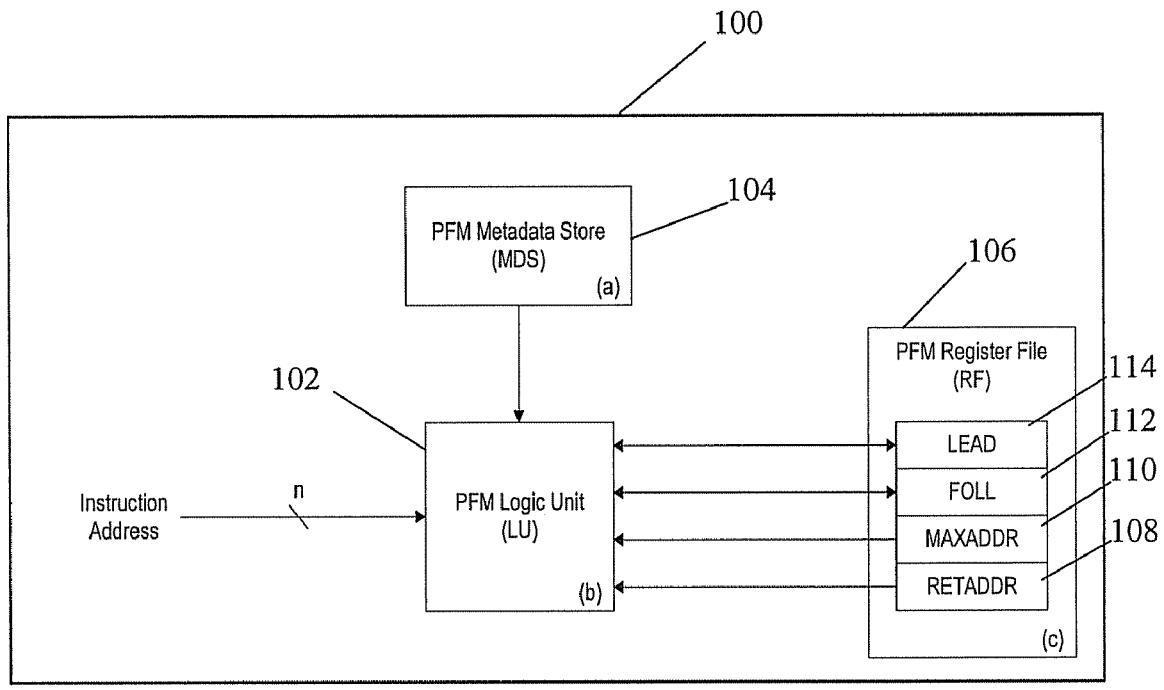
FIG. 1 illustrates a Program Flow Monitor (PFM) hardware-based malware protection solution according to an embodiment of the invention.
FIG. 2 illustrates an example of a pseudo-assembly code subroutine used in developing Leader-Follower pairs according to an embodiment of the invention.
FIG. 3 illustrates an example of a subroutine code with interrupt handler code according to an embodiment of the invention.

FIG. 1 illustrates a hardware-based embodiment of the PFM 100 for malware detection. The PFM 100 is composed of a Logic Unit (LU) 102, a Metadata Store (MDS) 104, and a Register File (RF) 106. The LU 102 takes as input the instruction address lines, the data pre-programmed into the MDS 104, and the data in the RF 106 registers. The LU 102 updates the registers in the RF 106 to record state changes, but the MDS 104 is never modified during program execution. The MDS 104 may be reprogrammed offline only. The MDS 104 stores the metadata in a format most quickly searched, such as ASCII, and can be reformatted to suit hardware requirements. The MDS 104 is a read-only memory device (ROM) accessible only by the PFM 100 subsystem, not the main central processing unit (CPU). Metadata specific to a given executable image is collected offline and used at runtime by the LU 102 to continuously monitor program flow by monitoring program memory addresses fetched. The PFM 100 detects faulty hardware, such as bad memory cells, as well as the presence of malware in embedded software. The PFM 100 is for use in embedded devices and can be applied in both single and multi-core processors—the multi-core case requires added hardware. The PFM 100 monitors physical addresses.

The metadata consists of valid physical address pairs. The first of the two addresses is a given physical program address that is in the address space of the executing program. The first address of the pair is referred to as 'Leader'. The second address is the address of the next instruction to be executed, referred to as 'Follower'. For each Leader, there is at least one valid Follower. However, there can be multiple Followers. Therefore, the Leader address may appear in the MDS 104 list several times, each time coupled with a different Follower address. The metadata is burned into ROM or captured in some other non-volatile, non-programmable memory device. It is preferred that this data be protected from any modification once programmed. This data is used by custom hardware, the LU 102, to detect illegal program control flow. Following a fetch from program memory, the LU 102 is programmed to latch the instruction address and verify that it is a valid follower address for the previously executed leader address. Metadata can be collected for the MDS 104 once a program has been compiled and linked. There are special considerations when collecting metadata for a program that contains interrupt handlers and/or exception handlers. The collection of metadata for the non-interrupt handler case will be described first, and then the interrupt/exception handler case will be described.

An example of organizing and formatting the Leader—Follower pairs in ASCII format in the MDS 104 is as follows. Output to an ASCII file each valid program address ("Leader") followed, on the same line, by exactly one valid follower address ("Follower"). Output all such pairs for each address through to the maximum executable address. The file will look something like this, assuming 32-bit longword-aligned program addresses and 32-bit opcodes fetched 32 bits at a time:

| Leader | Follower |
| --- | --- |
| 0000_0000 | 0000_0004 |
| 0000_0000 | 0000_4A20 |
| 0000_0004 | 0000_0008 |
| 0000_0008 | 0000_0000 |
| 0000_0008 | 0000_000C |
| ... | |
| FFFF_FFFC | 1234_5678 |

The operation of the Logic Unit 102 (LU) within the PFM 100 according to an embodiment of the invention is as follows:

a) LU receives as input all program (instruction) addresses fetched.

b) Latches each program address placed on the address bus by the CPU on completion of the read operation and stores it to the PFM Register File (RF). The RF is internal to the PFM—it is not accessible by the CPU.

c) At power up, stores the first address the CPU fetches, probably address 0000_0000, to location LEAD in the RF; stores the highest program address referenced by the MDS into register MAXADDR in the RF; latches the next program address fetched by the CPU into location FOLL in the RF.

d) Performs lookup of the address contained in LEAD in the MDS.

e) Generates an alarm if the address in LEAD is greater than the address stored in MAXADDR.

f) Generates an alarm if the address in LEAD is not found in the MDS. In this case, the LEAD address is considered illegal.

g) Generates an alarm if the address in LEAD is found in the MDS but the address in FOLL is not listed as a valid follower.

h) Copies the address is the FOLL register to the LEAD register if the LEAD-FOLL pair was found in the MDS.

i) Latches the next program address fetched and stores it to FOLL.

j) Repeat steps d-j.

Given an embedded program that has been compiled and linked and contains no interrupt handlers or exception handlers: For each valid program address in the map, use the map to construct the set of all possible addresses that may be fetched after the instruction at a given present address has been executed. For some instructions, the next consecutive address increment is the only option, but for branch instructions (and calls), the follower is the target of the branch (or call), and for conditional branches there are at least two valid followers. In addition, all jump tables must be considered and the jump-to addresses reflected in the list of valid follower addresses. (It may be necessary to use the map together with the executable image itself, to generate the full physical address. This depends on the tools used.)

Interrupt handlers and exception handlers pose a special problem both on the transfer of control to the handler, as well as on transfer of control back to the interrupted code segment. The starting address of a handler is considered to be a legal follower of every address which the handler can interrupt, and special logic is introduced to the LU 102 to latch the return address as the handler is entered. The return address is stored to a RETADDR register 108 of the PFM Register File 106. When the return from interrupt instruction (RETI) is executed, the address stored in RETADDR 108 is compared with the next address fetched by the CPU (which is in the FOLL (follow) register 112 at this point). In the case of mismatch, the LU 102 should raise an alarm. In the case of a match, the FOLL register 112 contents are copied to the LEAD register 112 by the LU 102. Subsequently, the LU 102 latches the next program address fetched and stores the program address to the FOLL register 112.

Given an embedded program that has been compiled and linked and contains interrupt handlers and/or exception handlers: For each valid program address in the map, use the map to construct the set of all possible addresses that may be fetched after the instruction at given present address has been executed. For some instructions, the next consecutive address increment is the only option, but for branch instructions (and calls) the follower is the target of the branch, and for conditional branches there are at least two valid followers. In addition, all jump tables must be considered and the jump-to addresses reflected in the list of valid follower addresses. In the case where interrupt handlers and/or exception handlers are included in the executable image, the start address of each handler (as captured in the Interrupt Descriptor Table, or IDT) must be paired with every address except those with an instruction that disables a specific interrupt, disables all interrupts, or is an address belonging to the interrupt handler itself.

It is assumed that interrupt handlers cannot interrupt each other but this is not always the case and so the data book for the specific processor must be consulted here. (It may be necessary to use the map together with the executable image itself, to generate the full physical address. This depends on the tools used.)

FIGS. 2 through 7 illustrate the steps involved in developing the Leader-Follower pairs given a simple program comprised of one subroutine (FIG. 2) and one interrupt handler in a subroutine (FIG. 3).

In FIG. 2, a pseudo-assembly code example representation of a subroutine X (sub x). The program addresses are shown in the first column to the left of the operation codes (opcode). The operation codes are as follows: cmp=compare; br=branch (jump); brxx=conditional branch where brgz=branch greater than zero, brez=branch if equal to zero; and add is an addition instruction. Register locations and memory locations are represented by r# and a1, b1, respectively.

The subroutine D (sub D) of FIG. 3 is made up of a number of no operation steps (nop) and a return from interrupt instruction (reti)

Figure 4:
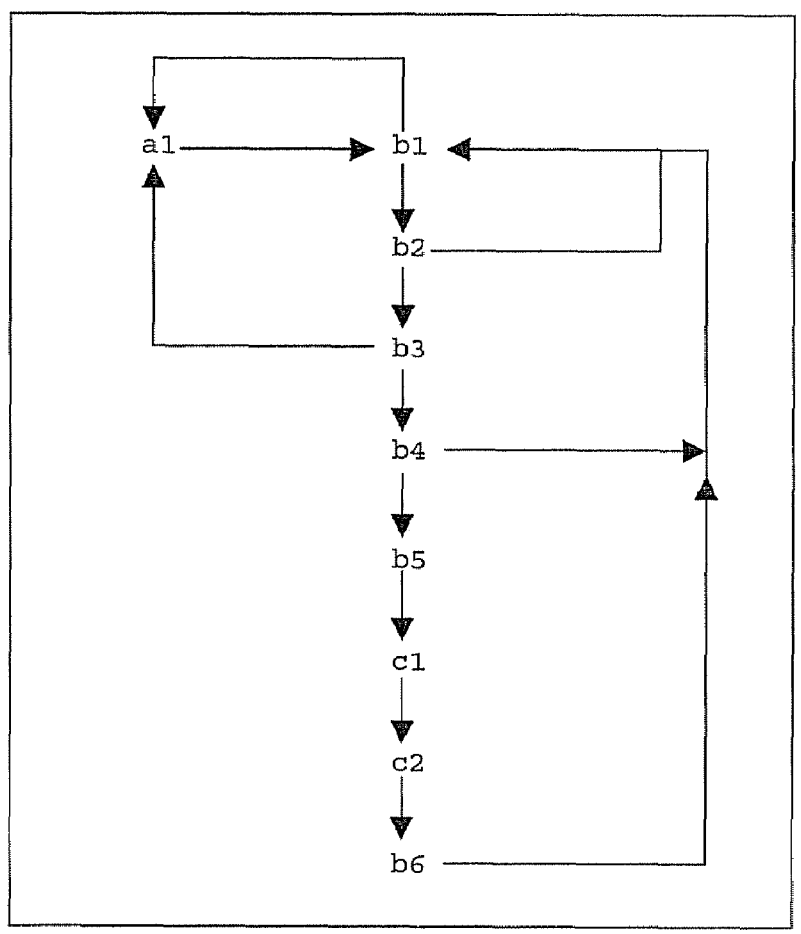
FIG. 4 is a graphical representation of control flow for program address ranges according to an embodiment of the invention.

FIG. 4 is a graphical representation of the program flow of the subroutine X of FIG. 2 for program address ranges ax, b1 . . . b6, c1, and c2.

Figure 5:
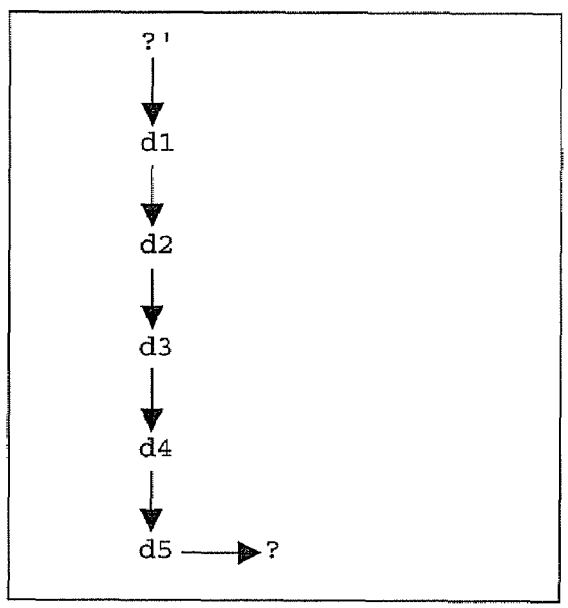
FIG. 5 is a graphical representation of control flow for program address ranges with interrupt handler code according to an embodiment of the invention.

In FIG. 5 a graphical representation of the program flow of subroutine D of FIG. 3 for program address range d1 through d6, which is interrupt handler code.

Note:

? stands for any line, as interrupt handler can return to any address, except for an address whose opcode disabled all interrupts, or disabled this particular interrupt, OR, a line in the dx address range.

?' stands for any line that could be executed before the interrupt occurred.

FIG. 6 presents the list of all possible Follower addresses (in parentheses) for each Leader address based on the example program depicted in FIG. 2 and FIG. 3. In FIG. 7 the data shown in FIG. 6 is fanned out to form a two-column list that would be representative of the Leader—Follower pairs of metadata that would be found in the MDS.

The representation of leader-follower pairs described herein should be understood to consider one possible embodiment of the present invention. Alternate embodiments which possess the same functionality are considered a part of the claimed invention. For instance, the list of leader-follower addresses may be compressed, or be replaced by a list of follower-leader pairs.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for malware detection, wherein the method comprises:
   utilizing a hardware based program flow monitor (PFM) for embedded software that employs a static analysis of program code;
   marrying the program code to addresses, while considering which central processing unit (CPU) is executing the program code;
   capturing an expected control flow of the program code, and storing the control flow as physical address pairs of leaders and followers (LEAD-FOLL pair) in a Metadata Store (MDS) within the PFM;
   monitoring control flow at runtime by the PFM;
   comparing runtime control flow with the expected control flow; and wherein the method further comprises:
   a) receiving a series of instruction addresses fetched by the central processing unit (CPU) into a logic unit (LU) within the PFM;
   b) latching by the LU of each of the series of instruction addresses placed on an address bus by the CPU on completion of a read operation, and storing the latched address in a register file (RF);
   c) storing at PFM power up the first address the CPU fetches to a first location in the RF, the highest program address referenced by a Metadata Store (MDS) into a second location in the RF, and latching the next instruction address fetched by the CPU into a third location in the RF;
   d) performing a lookup of the address contained in the first location in the MDS;
   e) generating an alarm if the address in the first location is greater than the address stored in the second location;
   f) generating an alarm if the address in the first location is not found in the MDS;
   g) generating an alarm if the address in the first location is found in the MDS, but the address in the third location is not listed as a valid follower;
   h) copying the address in the third location to the first location if the LEAD-FOLL pair is found in the MDS;
   i) latching by the LU of the next instruction address fetched by the CPU and storing it in the third location;
   j) repeating steps d-j, until the program code has been fully executed by the PFM.

2. The method of claim 1, wherein the storing the control flow as physical address pairs of leaders and followers comprises:
   metadata burned into read only memory (ROM), or captured in a non-volatile, non-programmable memory device where the metadata is protected from modification once programmed.

3. The method of claim 1, wherein each leader has at least one follower, where the follower is the address of the next instruction to be carried out; and
   wherein a leader can be a member of more than one LEAD-FOLL pair.

4. An article comprising non-transitory machine-readable storage media containing instructions that when executed by a processor enable the processor to provide malware detection, wherein the instructions cause implementation of:
   utilizing a hardware based program flow monitor (PFM) for embedded software that employs a static analysis of program code;
   marrying the program code to addresses, while considering which central processing unit (CPU) is executing the program code;
   capturing an expected control flow of the program code, and storing the control flow as physical address pairs of leaders and followers (LEAD-FOLL pair) in a Metadata Store (MDS) within the PFM;
   monitoring control flow at runtime by the PFM; and
   comparing runtime control flow with the expected control flow; wherein the instructions further cause implementation of:
   a) receiving a series of instruction addresses fetched by the central processing unit (CPU) into a logic unit (LU) within the PFM;
   b) latching by the LU of each of the series of instruction addresses placed on an address bus by the CPU on completion of a read operation, and storing the latched address in a register file (RF);
   c) storing at PFM power up the first address the CPU fetches to a first location in the RF, the highest program address referenced by a Metadata Store (MDS) into a second location in the RF, and latching the next instruction address fetched by the CPU into a third location in the RF;
   d) performing a lookup of the address contained in the first location in the MDS;
   e) generating an alarm if the address in the first location is greater than the address stored in the second location;
   f) generating an alarm if the address in the first location is not found in the MDS;
   g) generating an alarm if the address in the first location is found in the MDS, but the address in the third location is not listed as a valid follower;
   h) copying the address in the third location to the first location if the LEAD-FOLL pair is found in the MDS:
   i) latching by the LU of the next instruction address fetched by the CPU and storing it in the third location;
   j) repeating steps d-j, until the program code has been full executed by the PFM.

5. A system for malware detection, the system comprising:
   a hardware based program flow monitor (PFM) for embedded software that employs a static analysis of program code;
   the PFM marrying the program code to addresses, while considering which central processing unit (CPU) is executing the program code;
   the PFM capturing an expected control flow of the program code, and storing the control flow as physical address pairs of leaders and followers (LEAD-FOLL pair) in a Metadata Store (MDS) within the PFM;

wherein the PFM further comprises:
a logic unit (LU);
and
a register file (RF)
wherein the PFM performs a process of:
a) receiving a series of instruction addresses fetched by the CPU into the LU within the PFM;
b) latching by the LU of each of the series of instruction addresses placed on an address bus by the CPU on completion of a read operation, and storing the latched address in the RF;
c) storing at PFM power up the first address the CPU fetches to a first location in the RF, the highest program address referenced by the MDS into a second location in the RF, and latching the next instruction address fetched by the CPU into a third location in the RF;
d) performing a lookup of the address contained in the first location in the MDS;
e) generating an alarm if the address in the first location is greater than the address stored in the second location;
f) generating an alarm if the address in the first location is not found in the MDS;
g) generating an alarm if the address in the first location is found in the MDS, but the address in the third location is not listed as a valid follower;
h) copying the address in the third location to the first location if the LEAD-FOLL pair is found in the MDS;
i) latching by the LU of the next instruction address fetched by the CPU and storing it in the third location;
j) repeating steps d-j, until the program code has been fully executed by the PFM.

6. The system of claim 5, wherein:
the MDS is never modified during program execution.

7. The system of claim 5, wherein:
the MDS may be reprogrammed offline only.

8. The system of claim 5, wherein:
the MDS is a read-only memory device (ROM) accessible only by the PFM.

9. The system of claim 5, wherein:
the MDS has metadata specific to a given executable image that is collected offline and used at runtime by the LU to continuously monitor program flow by monitoring program memory addresses fetched.

10. The system of claim 5, wherein:
the PFM detects faulty hardware as well as the presence of malware in embedded software.

11. The system of claim 5, wherein:
the PFM is for use in embedded devices and can be applied in both single and multi-core processors.

12. The system of claim 5, wherein the RF further comprises:
a leader (LEAD) register for storing instruction addresses;
a follower (FOLL) register for storing the next address of the instruction to be executed based on the instruction address stored in the LEAD register;
a return address (RETADDR) for storing an address for a return from an interrupt instruction; and
a maximum address (MAXADDR) for storing the highest address in the program code.

13. The system of claim 5, wherein:
the LU takes as input instruction address lines, data preprogrammed into the MDS, and the data in the RF; and
wherein the LU updates a set of registers in the RF to record state changes.

* * * * *